US012809654B2

(12) United States Patent
Suryanarayana et al.

(10) Patent No.: US 12,809,654 B2
(45) Date of Patent: Nov. 24, 2026

(54) BARE-METAL DEPLOYMENT AND BOOT OF CLOUD HYPERVISOR WITH SOC AGNOSTICISM

(71) Applicant: Dell Products L.P., Round Rock, TX (US)

(72) Inventors: Shekar Babu Suryanarayana, Bangalore (IN); Anand Prakash Joshi, Round Rock, TX (US); Sumanth Vidyadhara, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 596 days.

(21) Appl. No.: 18/311,586

(22) Filed: May 3, 2023

(65) Prior Publication Data

US 2024/0370285 A1 Nov. 7, 2024

(51) Int. Cl.
*G06F 9/455* (2018.01)

(52) U.S. Cl.
CPC ...... *G06F 9/45558* (2013.01); *G06F 9/45541* (2013.01); *G06F 2009/4557* (2013.01); *G06F 2009/45579* (2013.01)

(58) Field of Classification Search
CPC ............ G06F 9/45558; G06F 9/45541; G06F 2009/4557; G06F 2009/45579
See application file for complete search history.

(56) References Cited

U.S. PATENT DOCUMENTS

| | | | | |
|---|---|---|---|---|
| 11,803,407 B1* | 10/2023 | Gadalin | ................ | G06F 9/4856 |
| 2012/0317568 A1* | 12/2012 | Aasheim | .............. | G06F 9/5094 718/1 |
| 2013/0297849 A1* | 11/2013 | Wagner | ............... | G06F 9/45541 711/6 |
| 2014/0173113 A1* | 6/2014 | Vemuri | ............... | H04L 41/5022 709/226 |
| 2020/0241901 A1* | 7/2020 | Tarasuk-Levin | .... | H04L 61/5007 |
| 2022/0261263 A1* | 8/2022 | Belkar | ................ | G06F 9/45533 |
| 2023/0401080 A1* | 12/2023 | Scrivano | ............. | G06F 9/45558 |

* cited by examiner

*Primary Examiner* — Michael W Ayers
(74) *Attorney, Agent, or Firm* — Jackson Walker L.L.P.

(57) ABSTRACT

An information handling system may include at least one processor and a storage resource having a bare-metal operating system thereon. Upon a first boot of the information handling system, the bare-metal operating system may deploy a hypervisor to be executed by the at least one processor; and implement a device enumeration protocol mapping virtual objects associated with the bare-metal operating system to virtual device objects associated with the hypervisor.

18 Claims, 4 Drawing Sheets

BARE-METAL DEPLOYMENT AND BOOT OF CLOUD HYPERVISOR WITH SOC AGNOSTICISM

TECHNICAL FIELD

The present disclosure relates in general to information handling systems, and more particularly to cloud-based hypervisors in the context of bare-metal deployments.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In the virtualization context, a "bare metal" hypervisor (also referred to as a native or a Type 1 hypervisor) runs directly on host machine hardware with no operating system beneath. These hypervisors communicate directly with the host machine resources. Examples of such hypervisors are VMware ESXi and Microsoft Hyper-V.

Embodiments of this disclosure provide a bare-metal operating system referred to as PODS that is configured to deploy and boot a cloud hypervisor. PODS allows for dynamic remapping of device-specific workloads and reconfiguration of platform attributes without requiring a system reboot. In the initial boot, PODS may prepare virtual objects to map them to a cloud-native hypervisor, enabling faster boot in a multi-tenanted cloud work environment.

For a type-1 hypervisor, a bare-metal passthrough protocol supports a wide range of para-virtualized devices by mapping to modular device paths to provide efficient execution of heterogeneous workloads in a cloud ecosystem (e.g., across heterogeneous hypervisors and hardware). PODS may also simplify the use of a hosted hypervisor as discussed herein.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with deploying and booting cloud hypervisors may be reduced or eliminated.

In accordance with embodiments of the present disclosure, an information handling system may include at least one processor and a storage resource having a bare-metal operating system thereon. Upon a first boot of the information handling system, the bare-metal operating system may deploy a hypervisor to be executed by the at least one processor; and implement a device enumeration protocol mapping virtual objects associated with the bare-metal operating system to virtual device objects associated with the hypervisor.

In accordance with these and other embodiments of the present disclosure, a method may include upon a first boot of an information handling system that includes a storage resource having a bare-metal operating system thereon, the bare-metal operating system deploying a hypervisor to be executed by at least one processor of the information handling system; and the bare-metal operating system implementing a device enumeration protocol mapping virtual objects associated with the bare-metal operating system to virtual device objects associated with the hypervisor.

In accordance with these and other embodiments of the present disclosure, an article of manufacture may include a non-transitory, computer-readable medium having computer-executable code thereon that is executable by an information handling system for: upon a first boot of the information handling system, a bare-metal operating system deploying a hypervisor to be executed by at least one processor of the information handling system; and the bare-metal operating system implementing a device enumeration protocol mapping virtual objects associated with the bare-metal operating system to virtual device objects associated with the hypervisor.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
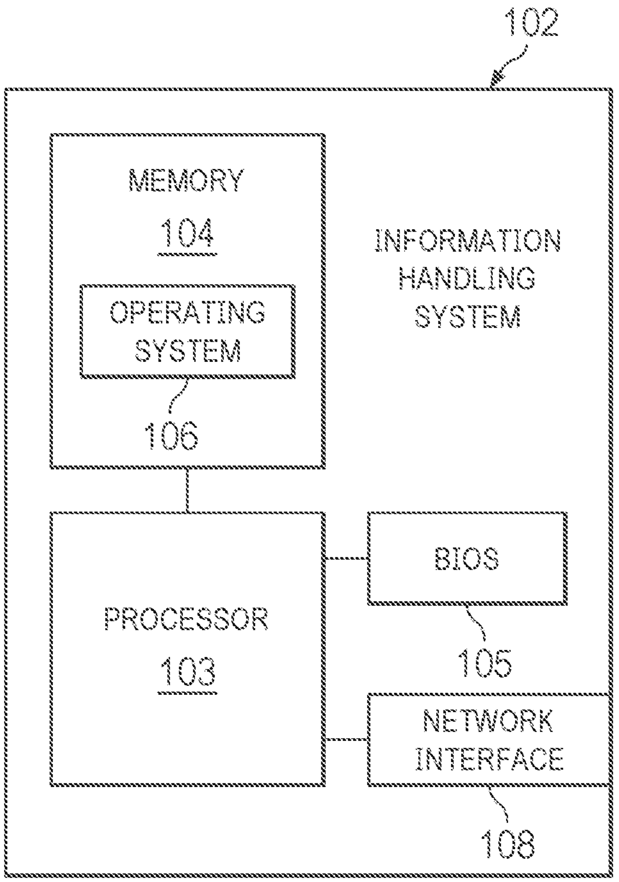
FIG. 1 illustrates a block diagram of an example information handling system, in accordance with embodiments of the present disclosure.

Preferred embodiments and their advantages are best understood by reference to FIGS. 1 through 4, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), a remote access controller (e.g., a Dell Remote Access Controller (DRAC) or Integrated Dell Remote Access Controller (iDRAC)), or an embedded controller (EC).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile and/or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Information handling system 102 may be configured for execution of one or more virtual machines (VMs), which may be managed via a virtual machine manager (VMM) such as a cloud hypervisor. In some embodiments, information handling system 102 may have a small bare-metal operating system (OS) installed (e.g., installed at the factory) on a storage resource that may boot and manage deployment and execution of a hypervisor. Such a bare-metal OS may be referred to herein as PODS.

The term "bare metal" generally refers to the fact that there is no OS between a given piece of software and the hardware. Bare-metal hypervisors are often used for enterprise and datacenter computing needs. In one embodiment, PODS may first perform a boot of the bare metal information handling system, and then locate and load the hypervisor for the platform. This hypervisor may be decoupled from the various host firmware components, allowing the hypervisor to be independent of platform firmware, since PODS abstracts it.

This arrangement may provide many benefits. For example, PODS enables cloud hypervisors with dynamic configuration data virtual objects with which VMs can be instantly spun up or down, as opposed to requiring days or weeks to deploy a bare metal platform. PODS enables faster bare metal deployments, allowing faster cloud hypervisor boot. PODS may also host reconfiguration data sets, enabling VMs to terminate to save organizations from paying for unnecessary infrastructure, but enabling quick initialization of VMs as and when required.

Further, PODS provides dynamic boot time configuration space and reconfiguration of various platform resources at runtime. This enables cloud hypervisors to run several VMs on a single physical platform and allows all the VMs to share its resources. This improves the platform utilization and saves on power, cooling, and datacenter space that is no longer needed for each individual VM.

Additionally, most cloud hypervisors are Type 1 (bare-metal), and PODS enables faster deployment of bare-metal cloud native hypervisors, enabling guest VMs and OSes to execute on a broad variety of hardware. PODS may also be used in the context of hosted hypervisors, however.

PODS provides remapping protocol virtual objects at runtime, which enable flexibility in the hypervisor to abstract the VMs from the underlying machine's drivers and devices.

PODS enables dynamic reconfiguration of platform hardware and a driver reload protocol, which provide hypervisors the ability to retune the runtime drivers to remediate any minor device/platform/application configuration mismatches.

PODS can also configure platforms for a cloud hypervisor in the same fashion, such that any interruption in workload execution can be easily migrated across platforms running different hypervisors, which increases the VM portability.

Figure 2:
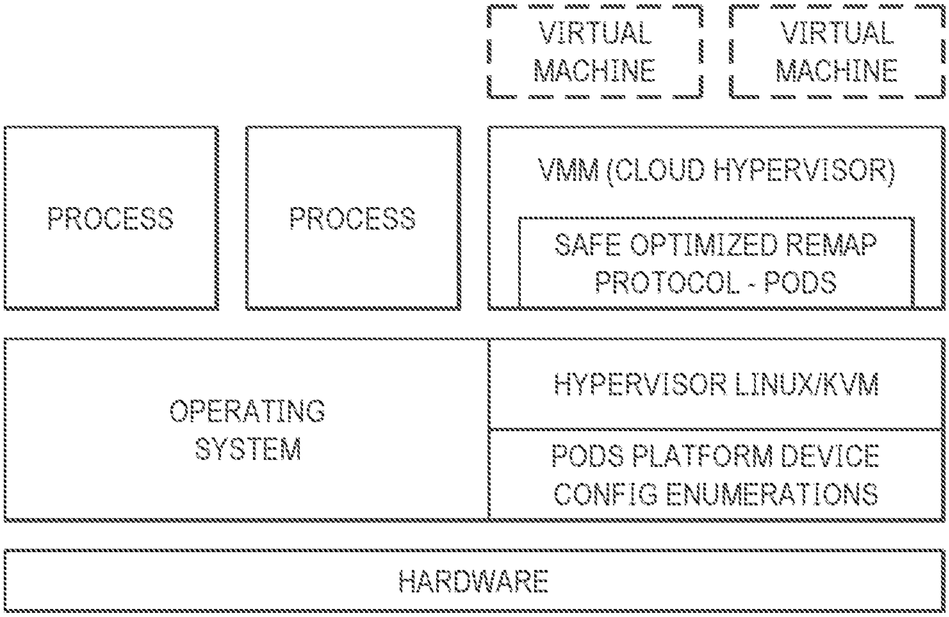
FIG. 2 illustrates a block diagram of an example architecture including a cloud hypervisor, in accordance with embodiments of the present disclosure.

FIG. 2 shows one example of a system configured with PODS. Various problems are addressed by PODS according to the present disclosure.

For example, currently, there are no SoC-agnostic protocols to dynamically enable a device and its configurations to be enumerated to runtime boot images for both x86-64 and AARCH64 architectures. Embodiments may be implemented in a cross-architecture fashion, able to run on x86-64, AARCH64, and/or other SoC architectures.

Additionally, existing VMM/hypervisor boot is quite slow to reach user space on top of a VM, and there is no optimized remapping configuration to dynamically enable secure direct kernel boot. Embodiments may provide for a faster boot, allowing the VMM/cloud hypervisor to boot to user space on top of a VM in less time with PODS's I/O remapping configurations to dynamically enable secure direct kernel boot. Embodiments may also allow for seamless and faster deployments for cloud hypervisors (e.g., type 1, bare-metal hypervisors).

Providing optimal classification of platform hardware over a secure enumeration of modular device paths across VMM/OS is also not possible in existing solutions, and so modern cloud workload execution is less efficient than desired. Embodiments may also allow the system to run cloud virtual machines securely and efficiently, running modern cloud workloads with minimal available platform hardware over a secure enumeration of device paths to the VMM/OS.

Broad device support on bare-metal firmware to support a wide range of para-virtualized devices and physical device passthrough has not been possible previously. Embodiments provide such broad support.

According to one embodiment, an optimized hardware-based VMM solution for a cloud application is enabled with SoC-agnostic platform device configuration enumerations at runtime to boot heterogeneous images without requiring a platform reboot. This enables faster switching of device-specific workloads in multitenant situations. PODS provides a safe optimized remapping protocol for faster boot of a VMM by dynamically enabling secure direct kernel boot. Further, a bare-metal passthrough protocol supports a wide range of para-virtualized devices by mapping to modular device paths to provide efficient execution of cloud workloads.

Figure 3:
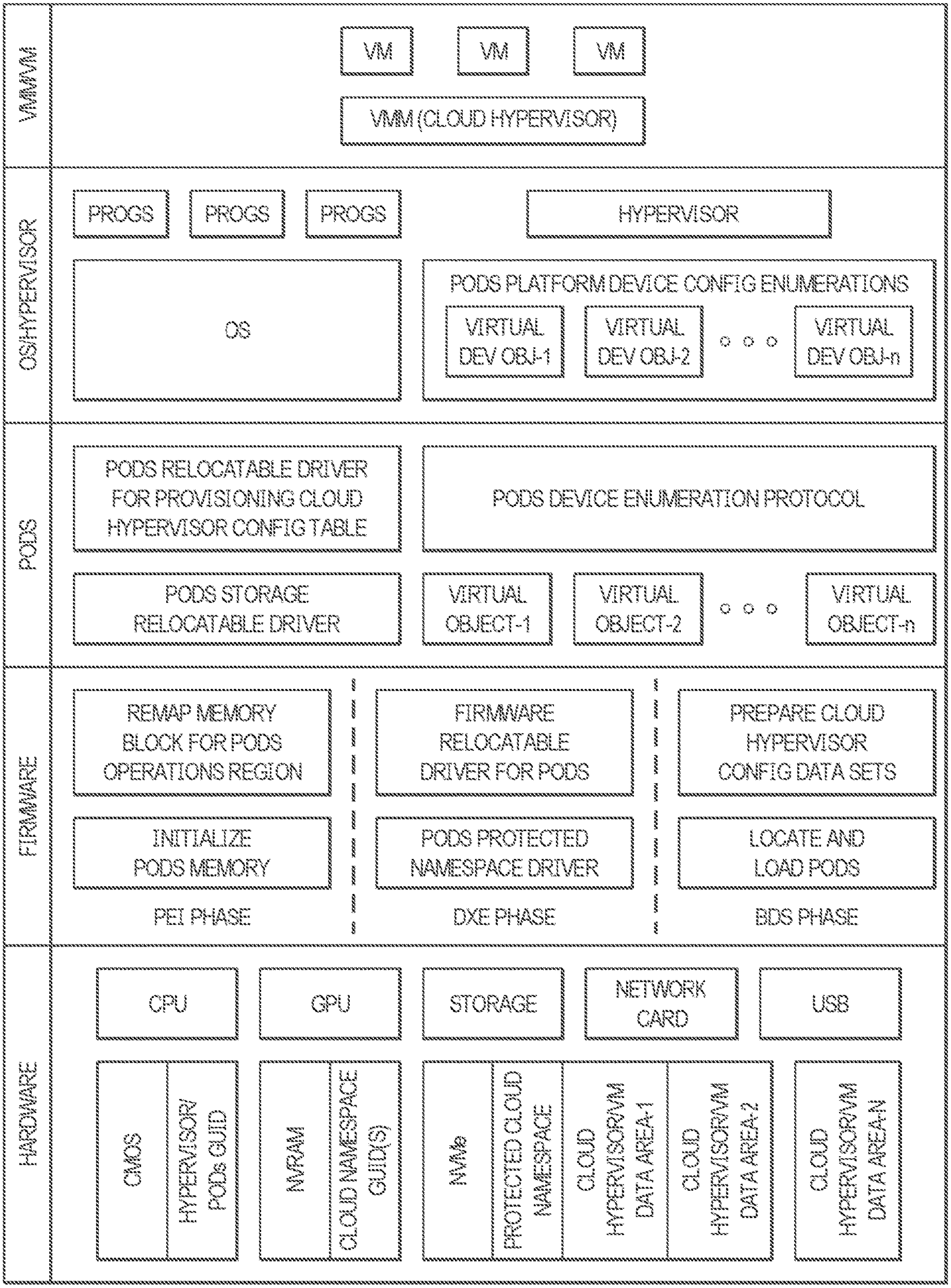
FIG. 3 illustrates a block diagram of an example architecture including a hardware layer, a firmware layer, a PODS layer, an OS/hypervisor layer, and a VMM/VM layer, in accordance with embodiments of the present disclosure.

Turning now to FIG. 3, an architectural diagram is shown of a system including a hardware layer, a firmware layer, a PODS layer, an OS/hypervisor layer, and a VMM/VM layer. Embodiments may provide an optimized hardware schema based on the hardware configuration, enabling SoC-agnostic platform device configuration enumerations at runtime to boot heterogeneous optimized images.

The pre-boot memory for PODS may be allocated and initialized in the PEI phase of boot after execution of the memory reference code (MRC). The remap memory block address space may be generated to allow for runtime relocation within the PODS operational space. In the early DXE phase of boot, a firmware relocatable driver may be loaded to initialize the protected namespace in storage space in NVRAM, CMOS, and NVMe.

Identification and classification of cloud hypervisor configuration datasets may be prepared, and PODS may boot in order to provision the cloud hypervisor configuration table, installing the device enumeration protocol with virtual device configuration objects mapping each VM to a device and cloud boot attributes.

The PODS device enumeration protocol collects the list of all virtual objects from the pre-boot space during the handoff at the time that ExitBootServices( ) is called and initializes all storage relocation drivers and relocatable drivers to provision the cloud hypervisor to boot and load one or more VMs. PODS may capture all boot path device configuration set information in the form of objects, creating a virtual map at the OS/hypervisor runtime space without requiring a platform reboot. Thus any OS/VM/hypervisor device/boot configurations can be applied enabling faster boot of a cloud-based hypervisor and associated VMs.

Figure 4:
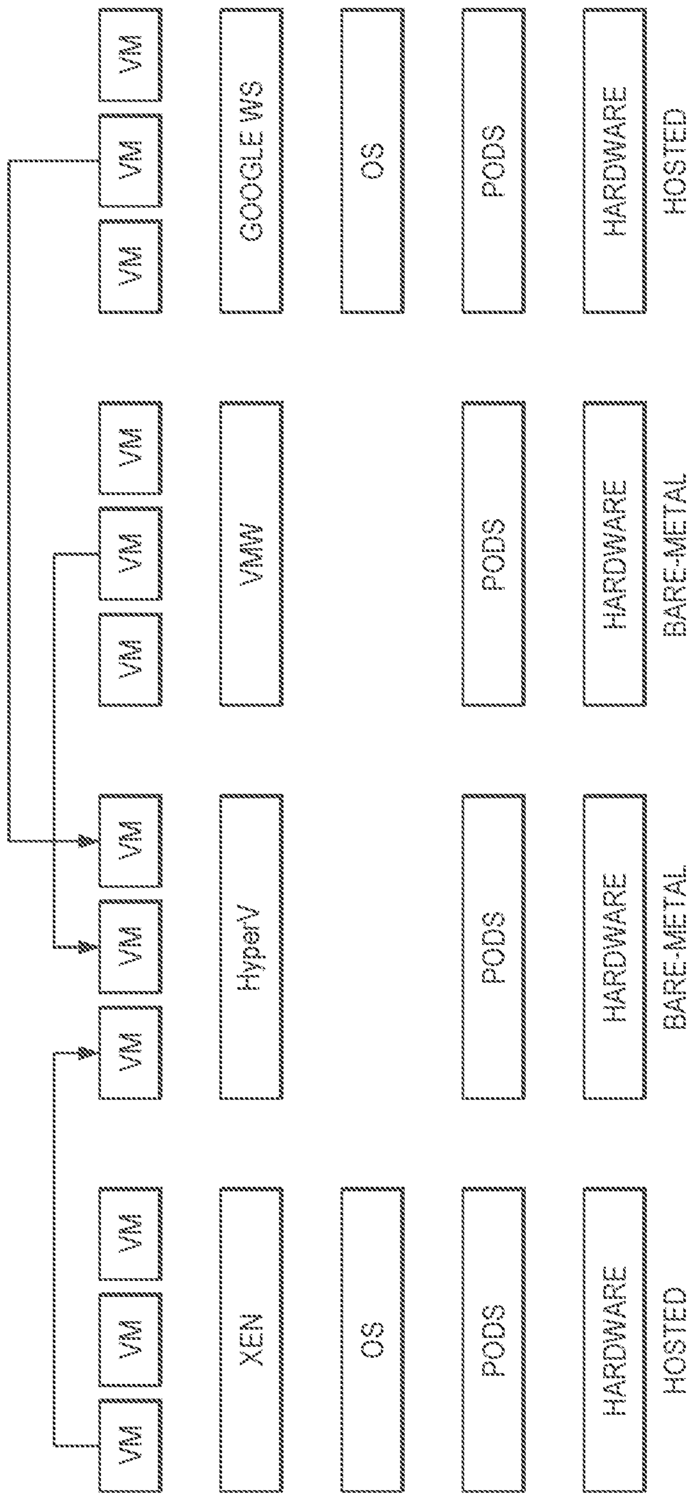
FIG. 4 illustrates a block diagram of an example architecture in which various bare-metal and hosted platforms are configured with PODS.

Turning now to FIG. 4, an example arrangement is shown in which various bare-metal and hosted platforms are configured with PODS and are running different hypervisors. PODS provides a fast method for reinitialization and a method for safe device reconfiguration that enables hypervisors to make it possible to gain a new level of system utilization. A cloud hypervisor is the underpinning of all cloud compute offerings, enabling VMs and containers to run side-by-side on a single server, whether those VMs belong to a single client or to multiple clients of the cloud provider. PODS ensures faster switch-over in this multi-tenancy context.

PODS plays a crucial role in dynamic remapping of device-specific workload alignment and reconfiguration of platform attributes without requiring a system reboot. When the platform is first booted, PODS prepares the virtual objects to map to a cloud-native hypervisor, enabling faster boot in a multitenant cloud environment. PODS also provides a safe optimized remap protocol for faster boot of a cloud hypervisor by dynamically enabling secure direct kernel boot.

For type-1 hypervisors, a bare-metal passthrough protocol supports a wide range of para-virtualized devices by mapping to modular device paths to provide efficient execution of heterogeneous workloads in a cloud ecosystem (e.g., across heterogeneous hypervisors and hardware).

PODS also simplifies the use of a hosted hypervisor by enabling dynamic reconfiguration of platform hardware and driver reload protocol, which provide hypervisors the ability to retune the runtime drivers to remediate any minor device/platform/application configuration mismatches.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:

at least one processor; and a storage resource having a bare-metal operating system thereon;

wherein, during a first boot of the information handling system, the information handling system is configured to:

allocate pre-boot memory during a Pre-Extensible Firmware Interface Initialization (PEI) phase of the first boot; and load, during a Driver Execution Environment (DXE) phase of the first boot, a relocatable firmware driver configured to initialize a protected namespace in non-volatile storage of the information handling system;

wherein, upon the first boot, the bare-metal operating system is configured to:

install a hypervisor to be executed by the at least one processor; and implement a device enumeration protocol mapping virtual objects associated with the bare-metal operating system to virtual device objects associated with the hypervisor, wherein the device enumeration protocol is configured to collect the virtual objects from the pre-boot memory during a handoff at which a call is made to exit boot services.

2. The information handling system of claim 1, wherein the hypervisor is a bare-metal hypervisor configured to execute directly on the information handling system.

3. The information handling system of claim 1, wherein the hypervisor is a cloud-based hypervisor.

4. The information handling system of claim 1, wherein the device enumeration protocol is an architecture-independent protocol configured to allow for execution of workloads associated with a plurality of different processor architectures.

5. The information handling system of claim 4, wherein the plurality of different processor architectures includes at least x86-64 and AARCH64.

6. The information handling system of claim 1, wherein the bare-metal operating system is further configured to provide a driver reload protocol configured to allow the hypervisor to reload at least one driver associated with the information handling system without a reboot.

7. A method comprising:

during a first boot of an information handling system that includes a storage resource having a bare-metal operating system thereon, allocating pre-boot memory during a Pre-Extensible Firmware Interface Initialization (PEI) phase of the first boot;

loading, during a Driver Execution Environment (DXE) phase of the first boot, a relocatable firmware driver configured to initialize a protected namespace in non-volatile storage of the information handling system;

upon the first boot of the information handling system, the bare-metal operating system installing a hypervisor to be executed by at least one processor of the information handling system; and the bare-metal operating system implementing a device enumeration protocol mapping virtual objects associated with the bare-metal operating system to virtual device objects associated with the hypervisor, wherein the device enumeration protocol collects the virtual objects from the pre-boot memory during a handoff at which a call is made to exit boot services.

8. The method of claim 7, wherein the hypervisor is a bare-metal hypervisor configured to execute directly on the information handling system.

9. The method of claim 7, wherein the hypervisor is a cloud-based hypervisor.

10. The method of claim 7, wherein the device enumeration protocol is an architecture-independent protocol configured to allow for execution of workloads associated with a plurality of different processor architectures.

11. The method of claim 10, wherein the plurality of different processor architectures includes at least x86-64 and AARCH64.

12. The method of claim 7, wherein the bare-metal operating system is further configured to provide a driver reload protocol configured to allow the hypervisor to reload at least one driver associated with the information handling system without a reboot.

13. An article of manufacture comprising a non-transitory, computer-readable medium having computer-executable code thereon that is executable by an information handling system for:

during a first boot of the information handling system that includes a storage resource having a bare-metal operating system thereon, allocating pre-boot memory during a Pre-Extensible Firmware Interface Initialization (PEI) phase of the first boot;

loading, during a Driver Execution Environment (DXE) phase of the first boot, a relocatable firmware driver configured to initialize a protected namespace in non-volatile storage of the information handling system;

upon the first boot of the information handling system, the bare-metal operating system installing a hypervisor to be executed by at least one processor of the information handling system; and the bare-metal operating system implementing a device enumeration protocol mapping virtual objects associated with the bare-metal operating system to virtual device objects associated with the hypervisor, wherein the device enumeration protocol collects the virtual objects from the pre-boot memory during a handoff at which a call is made to exit boot services.

14. The article of claim 13, wherein the hypervisor is a bare-metal hypervisor configured to execute directly on the information handling system.

15. The article of claim 13, wherein the hypervisor is a cloud-based hypervisor.

16. The article of claim 13, wherein the device enumeration protocol is an architecture-independent protocol configured to allow for execution of workloads associated with a plurality of different processor architectures.

17. The article of claim 16, wherein the plurality of different processor architectures includes at least x86-64 and AARCH64.

18. The article of claim 13, wherein the bare-metal operating system is further configured to provide a driver reload protocol configured to allow the hypervisor to reload at least one driver associated with the information handling system without a reboot.

* * * * *